(12) United States Patent
Yu et al.

(10) Patent No.: US 11,839,006 B2
(45) Date of Patent: Dec. 5, 2023

(54) BACKLIGHT CONTROL CIRCUIT, METHOD FOR DRIVING THE SAME, BACKLIGHT MODULE AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Jie Yu, Beijing (CN); Pengtao Li, Beijing (CN); Yangyang Zhang, Beijing (CN); Daekeun Yoon, Beijing (CN); Qing Ma, Beijing (CN); Rui Han, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 583 days.

(21) Appl. No.: 16/979,561

(22) PCT Filed: Nov. 22, 2019

(86) PCT No.: PCT/CN2019/120324
§ 371 (c)(1),
(2) Date: Sep. 10, 2020

(87) PCT Pub. No.: WO2021/097813
PCT Pub. Date: May 27, 2021

(65) Prior Publication Data
US 2023/0099048 A1    Mar. 30, 2023

(51) Int. Cl.
*H05B 47/20* (2020.01)
*G09G 3/36* (2006.01)
(Continued)

(52) U.S. Cl.
CPC ........... *H05B 47/20* (2020.01); *G02F 1/1336* (2013.01)

(58) Field of Classification Search
CPC ........ H05B 47/20; H05B 47/24; H05B 47/25; G09G 3/20; G09G 3/006; G09G 3/34;
(Continued)

(56) References Cited

U.S. PATENT DOCUMENTS

2007/0052372 A1    3/2007   Ryu
2007/0279368 A1    12/2007  Shefter
(Continued)

FOREIGN PATENT DOCUMENTS

CN    1928974 A      3/2007
CN    101861009 A    10/2010
(Continued)

*Primary Examiner* — Thai Pham
(74) *Attorney, Agent, or Firm* — ArentFox Schiff LLP; Michael Fainberg

(57) ABSTRACT

Embodiments of the present disclosure provide a backlight control circuit, a method for driving the same, a backlight module and a display apparatus. The backlight control circuit includes: an undervoltage protection circuit, electrically connected with a power supply voltage input end and a ground, and configured to output a closing control signal through an output end of the undervoltage protection circuit according to a voltage at the power supply voltage input end and an undervoltage threshold value; and a backlight driving circuit, electrically connected with a voltage supply end, a backlight driving output end and the output end of the undervoltage protection circuit separately, and configured to enable a port of the backlight driving circuit when receiving an enabling control signal for processing a voltage at the voltage supply end and outputting the processed voltage to the backlight driving output end, and stop working when receiving the closing control signal.

8 Claims, 4 Drawing Sheets

(51) Int. Cl.
*G02F 1/133* (2006.01)
*G02F 1/13357* (2006.01)

(58) Field of Classification Search
CPC .... G09G 3/3406; G09G 3/36; G09G 2330/04; G02F 1/13; G02F 1/1336; G02F 1/133602; G02F 1/133
See application file for complete search history.

(56) References Cited

U.S. PATENT DOCUMENTS

| | | | |
|---|---|---|---|
| 2010/0259181 A1 | 10/2010 | Fujimura et al. | |
| 2014/0168052 A1* | 6/2014 | Zhang | G09G 3/3406 315/291 |
| 2014/0333520 A1* | 11/2014 | Zhang | G09G 3/3406 315/122 |
| 2015/0241891 A1* | 8/2015 | Lee | H05B 47/20 315/127 |
| 2020/0183210 A1* | 6/2020 | Zhang | G02F 1/13306 |
| 2020/0357319 A1* | 11/2020 | Xu | G09G 3/20 |

FOREIGN PATENT DOCUMENTS

| | | |
|---|---|---|
| CN | 103065588 A2 | 4/2013 |
| CN | 103198809 A | 7/2013 |
| CN | 103295537 A | 9/2013 |

\* cited by examiner

BACKLIGHT CONTROL CIRCUIT, METHOD FOR DRIVING THE SAME, BACKLIGHT MODULE AND DISPLAY APPARATUS

The present application is a US National Stage of International Application No. PCT/CN2019/120324, filed on Nov. 22, 2019, and entitled "BACKLIGHT CONTROL CIRCUIT, METHOD FOR DRIVING THE SAME, BACKLIGHT MODULE AND DISPLAY APPARATUS", the entire contents of which are incorporated herein by reference.

FIELD

The present disclosure relates to the technical field of display, in particular to a backlight control circuit, a method for driving the same, a backlight module and a display apparatus.

BACKGROUND

A liquid crystal display panel is a non-self-luminous apparatus, and needs a backlight module to provide a light source to realize a display function. The backlight module generally includes a backlight driving circuit and a backlight source, wherein the backlight driving circuit provides a voltage for the backlight source to light the backlight source so as to cooperate with the liquid crystal display panel to realize the display function.

SUMMARY

A backlight control circuit provided by one or more embodiments of the present disclosure includes:
  an undervoltage protection circuit, electrically connected with a power supply voltage input end and a ground separately; wherein the undervoltage protection circuit is configured to output a closing control signal through an output end of the undervoltage protection circuit according to a voltage at the power supply voltage input end and an undervoltage threshold value; and
  a backlight driving circuit, electrically connected with a voltage supply end, a backlight driving output end and the output end of the undervoltage protection circuit separately; wherein the backlight driving circuit is configured to enable a port of the backlight driving circuit when receiving an enabling control signal, for processing a voltage at the voltage supply end and outputting a processed voltage to the backlight driving output end, and configured to stop working when receiving the closing control signal.

Optionally, in one or more embodiments of the present disclosure, the undervoltage protection circuit includes:
  a voltage dividing circuit, electrically connected with the power supply voltage input end and the ground separately, wherein the voltage dividing circuit is configured to divide a voltage between the power supply voltage input end and the ground and output the divided voltage through an output end of the voltage dividing circuit; and
  an undervoltage control circuit, electrically connected with the output end of the voltage dividing circuit and the ground separately, wherein the undervoltage control circuit is configured to output a signal at the ground as the closing control signal through the output end of the undervoltage protection circuit when the divided voltage output by an output end of the voltage dividing circuit is lower than the undervoltage threshold value.

Optionally, in one or more embodiments of the present disclosure, the undervoltage threshold value is within a range of 4 V to 5 V.

Optionally, in one or more embodiments of the present disclosure, the undervoltage protection circuit includes: a voltage monitoring reset chip.

Optionally, in one or more embodiments of the present disclosure, the voltage dividing circuit includes: a first resistor and a second resistor;
  wherein a second end of the first resistor is used as the output end of the voltage dividing circuit;
  a first end of the first resistor is electrically connected with the power supply voltage input end;
  the second end of the first resistor is electrically connected with a first end of the second resistor; and
  a second end of the second resistor is electrically connected with the ground.

Optionally, in one or more embodiments of the present disclosure, the backlight driving circuit is configured to boost the voltage at the voltage supply end when receiving the enabling control signal and output the boosted voltage to the backlight driving output end.

One or more embodiments of the present disclosure further provide a method for driving the backlight control circuit, wherein the method includes:
  stopping power supply to the power supply voltage input end;
  outputting, by the undervoltage protection circuit, the closing control signal through the output end of the undervoltage protection circuit according to the voltage at the power supply voltage input end and the undervoltage threshold value; and
  stopping, by the backlight driving circuit, working when receiving the closing control signal.

Optionally, in one or more embodiments of the present disclosure, said outputting, by the undervoltage protection circuit, the closing control signal through the output end of the undervoltage protection circuit according to the voltage at the power supply voltage input end and the undervoltage threshold value specifically includes:
  dividing, by a voltage dividing circuit, a voltage between the power supply voltage input end and the ground and outputting, by the voltage dividing circuit, the divided voltage through an output end of the voltage dividing circuit; and
  outputting, by an undervoltage control circuit, a signal at the ground as the closing control signal through the output end of the undervoltage protection circuit when the divided voltage output by the output end of the voltage dividing circuit is lower than the undervoltage threshold value.

Optionally, in one or more embodiments of the present disclosure, before stopping power supply to the power supply voltage input end, the method further includes:
  supplying power to the power supply voltage input end;
  loading the enabling control signal onto the backlight driving circuit after a time threshold value; and
  when the backlight driving circuit receives the enabling control signal, enabling the port of the backlight driving circuit, processing the voltage at the voltage supply end, and outputting the processed voltage to the backlight driving output end;
  wherein within the time threshold value, the undervoltage protection circuit outputs the closing control signal through the output end of the undervoltage protection circuit according to the voltage at the power supply voltage input end and the undervoltage threshold value; and the backlight driving circuit stops working when receiving the closing control signal.

Optionally, in one or more embodiments of the present disclosure, within the time threshold value, a voltage dividing circuit divides a voltage between the power supply voltage input end and the ground, and outputs the divided voltage through an output end of the voltage dividing circuit;

an undervoltage control circuit outputs a signal at the ground as the closing control signal through the output end of the undervoltage protection circuit when the divided voltage output by the output end of the voltage dividing circuit is lower than the undervoltage threshold value; and the backlight driving circuit stops working when receiving the closing control signal.

One or more embodiments of the present disclosure further provide a backlight module, wherein the backlight module includes:

a backlight source; and a backlight control circuit, wherein the backlight driving output end is electrically connected with the backlight source, and the backlight control circuit is the above-mentioned backlight control circuit.

One or more embodiments of the present disclosure further provide a display apparatus, wherein the display apparatus includes:

a display panel; and a backlight module, wherein the backlight module is located on a light incidence side of the display panel, and the backlight module is the above-mentioned backlight module.

DETAILED DESCRIPTION OF THE EMBODIMENTS

Figure 1:
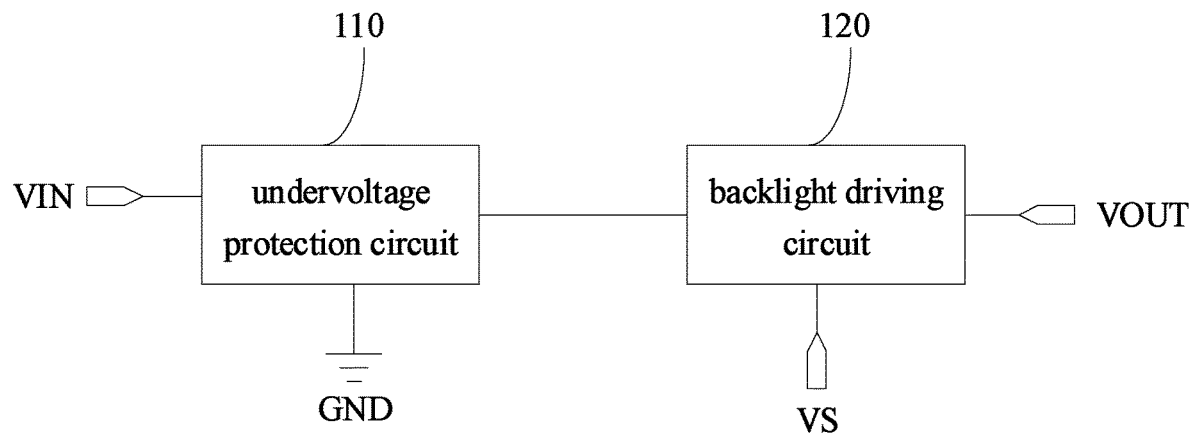
FIG. 1 is a schematic structural diagram of a backlight control circuit provided by one or more embodiments of the present disclosure.

In order to make objects, technical solutions and advantages of embodiments of the present disclosure clearer, the technical solutions of the embodiments of the present disclosure will be clearly and completely described below with reference to accompanying drawings of the embodiments of the present disclosure. Obviously, the described embodiments are parts of the embodiments of the present disclosure, not all the embodiments. In addition, the embodiments in the present disclosure and features in the embodiments may be combined with one another without conflict. Based on the described embodiments of the present disclosure, all other embodiments obtained by a person of ordinary skill in the art without inventive labor fall within the scope of protection of the present disclosure.

Unless otherwise defined, technical or scientific terms used in the present disclosure should have ordinary meanings as understood by a person of ordinary skill in the art to which the present disclosure belongs. Words of "first", "second" and the like used in the present disclosure do not denote any order, quantity, or importance, but are merely used for distinguishing different components. The words "comprising", "including" or the like are intended to denote that an element or item present in front of the word encompasses listed elements or items present behind the word and equivalents thereof, but do not exclude other elements or items. A word of "connected", "connection" or the like is not limited to physical or mechanical connection, but may include electrical connection, whether direct or indirect.

It should be noted that dimensions and shapes of diagrams in the accompanying drawings do not reflect true ratios, and are merely intended to illustrate contents of the present disclosure. In addition, from beginning to end, the same or similar reference numbers denote the same or similar elements or elements having the same or similar function.

A backlight driving circuit generally employs a boost chopper. When an enabling control signal is received, a port of the boost chopper may be enabled, such that the boost chopper may boost an input voltage and then supply a boosted voltage to a backlight source in response to a pulse width modulation (PWM) signal, to control the backlight source to emit light.

However, in practical application, a high current may occur when power supply to a port for inputting a voltage into the backlight driving circuit is stopped, which leads to a problem of damage to elements (for example, inductors and diodes) in the backlight driving circuit. The reasons for the problem are as follows: for example, the backlight driving circuit generally may work at a voltage of 2.7 V or higher, and the port for inputting the voltage into the backlight driving circuit is supplied with a voltage converted by a power conversion system, such that when power supply to a display apparatus is stopped, in combination with an effect of a voltage stabilizing capacitor of the power conversion system, the voltage at the port for inputting the voltage into the backlight driving circuit slowly drops instead of immediately dropping to 0 V. If power supply to the display apparatus is stopped, the enabling control signal still may enable the port of the backlight driving circuit, and the backlight driving circuit still may work. However, the voltage input into the backlight driving circuit drops, and the backlight source is lighted by employing constant power, such that a current flowing through the backlight source rises, which makes a current flowing through the elements such as the inductors and the diodes in the backlight driving circuit rise to generate the high current to damage the elements such as the inductors and the diodes.

Based on this, one or more embodiments of the present disclosure provide several backlight control circuits, and as shown in FIG. 1, the backlight control circuit may include:

an undervoltage protection circuit, electrically connected with a power supply voltage input end (VIN) and a ground (GND) separately, wherein the undervoltage protection circuit 110 is configured to output a closing control signal through an output end of the undervoltage protection circuit 110 according to a voltage at the power supply voltage input end (VIN) and an undervoltage threshold value; and a backlight driving circuit, electrically connected with a voltage supply end (VS), a backlight driving output end (VOUT) and the output end of the undervoltage protection circuit 110 separately, wherein the backlight driving circuit 120 is configured to enable a port of the backlight driving circuit 120 when receiving an enabling control signal, for processing a voltage at the voltage supply end (VS) and outputting the processed voltage to the backlight driving output end (VOUT), and configured to stop working when receiving the closing control signal.

According to the backlight control circuit provided by the embodiments of the present disclosure, the backlight driving circuit may enable the port of the backlight driving circuit when receiving the enabling control signal, for processing the voltage at the voltage supply end and outputting the processed voltage to the backlight driving output end, to output the voltage to a backlight source through the backlight driving output end to drive the backlight source to be lighted. By arranging the undervoltage protection circuit, the undervoltage protection circuit outputs the closing control signal to the backlight driving circuit through the output end of the undervoltage protection circuit according to the relationship between the voltage at the power supply voltage input end and the undervoltage threshold value, and the backlight driving circuit may stop working when receiving the closing control signal. In this way, when the voltage at the power supply voltage input end changes, the closing control signal may be output to the backlight driving circuit through the undervoltage protection circuit, so as to control the backlight driving circuit to stop working, that is, voltage output to the backlight source is stopped, such that the high current is avoided, and then the loss problem of the elements such as the inductors and the diodes is alleviated.

During specific implementation, in one or more embodiments of the present disclosure, the backlight control circuit may be applied to a display apparatus. In addition, the display apparatus is generally provided with a power conversion system, which may receive a voltage (for example, a voltage of a battery) through the port, convert the voltage input into the power conversion system, and then output the converted voltage to the display apparatus through an output port of the power conversion system to supply power to the display apparatus. In addition, when the voltage input into the power conversion system is stopped or the power is suddenly cut off, the power conversion system will have no input voltage. Due to existence of the voltage stabilizing capacitor, the voltage at the output port of the power conversion system may slowly drop. During specific implementation, in one or more embodiments of the present disclosure, the output port for outputting voltage of the power conversion system may be used as the power supply voltage input end (VIN) and the voltage supply end (VS). That is, the power supply voltage input end (VIN) and the voltage supply end (VS) may receive the voltage from the same input end. In this way, the voltage may be input into the voltage supply end (VS) of the backlight driving circuit 120 such that the backlight driving circuit 120 may process the voltage at the voltage supply end (VS) and then output the processed voltage through the backlight driving output end (VOUT). Certainly, during specific implementation, due to the fact that application environments of different display apparatuses are different, the power supply voltage input end (VIN) and the voltage supply end (VS) may be designed and determined according to the actual application environment, and are not limited herein.

During specific implementation, in one or more embodiment of the present disclosure, the backlight driving circuit 120 may be configured to boost the voltage at the voltage supply end (VS) when receiving the enabling control signal and then output the boosted voltage to the backlight driving output end (VOUT). Illustratively, the backlight driving circuit 120 may include a boost chopper. In this way, when the boost chopper receives the enabling control signal, a port of the boost chopper may be enabled, and the boost chopper boosts the input voltage and then supplies the boosted voltage to the backlight source under the control of a PWM signal, to control the backlight source to emit light.

It should be noted that the port for receiving the closing control signal and the port for receiving the enabling control signal by the backlight driving circuit 120 may be the same port. In this way, the backlight driving circuit 120 may enable the port when receiving the enabling control signal to control the backlight driving circuit 120 to work. The backlight driving circuit 120 may be controlled to stop working when receiving the closing control signal. Illustratively, in general, the enabling control signal is set as a high level signal, and accordingly, the closing control signal may be set as a low level signal.

Figure 2:
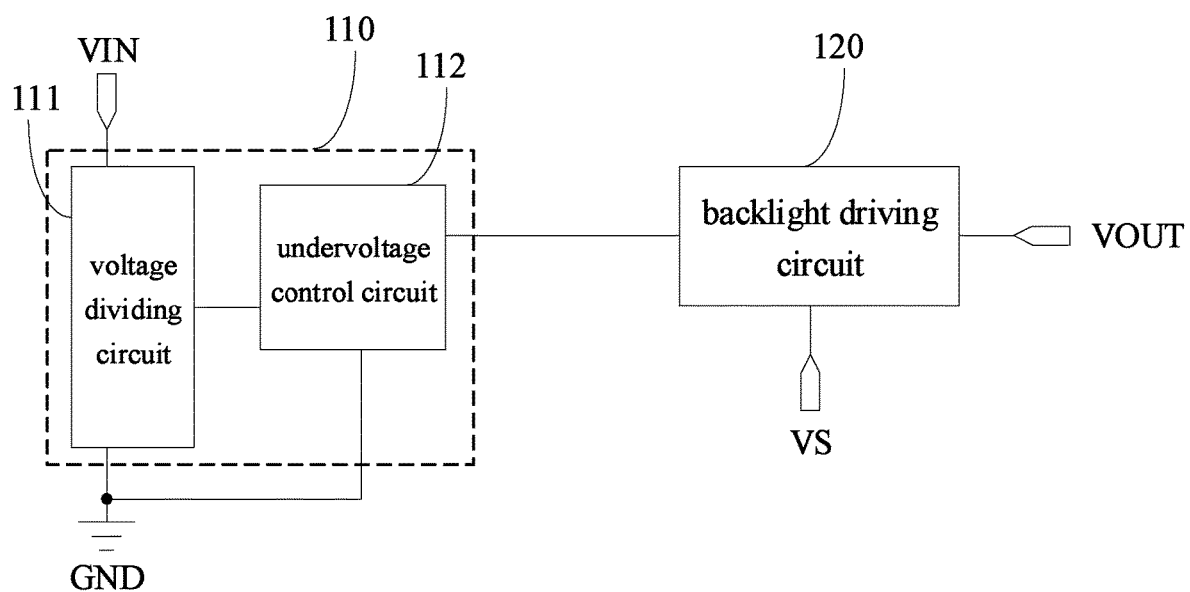
FIG. 2 is a specific schematic structural diagram of several backlight control circuits provided by one or more embodiments of the present disclosure.

During specific implementation, in one or more embodiments of the present disclosure, as shown in FIG. 2, the undervoltage protection circuit 110 may include:

a voltage dividing circuit 111, configured to be electrically connected with the power supply voltage input end (VIN) and the ground separately, wherein the voltage dividing circuit 111 is configured to divide a voltage between the power supply voltage input end (VIN) and the ground, and output the divided voltage through an output end of the voltage dividing circuit; and an undervoltage control circuit 112, configured to be electrically connected with the output end of the voltage dividing circuit 111 and the ground separately, wherein the undervoltage control circuit 112 is configured to output a signal at the ground as the closing control signal through the output end of the undervoltage protection circuit 110 when the divided voltage output by the output end of the voltage dividing circuit 111 is lower than the undervoltage threshold value.

Figure 3:
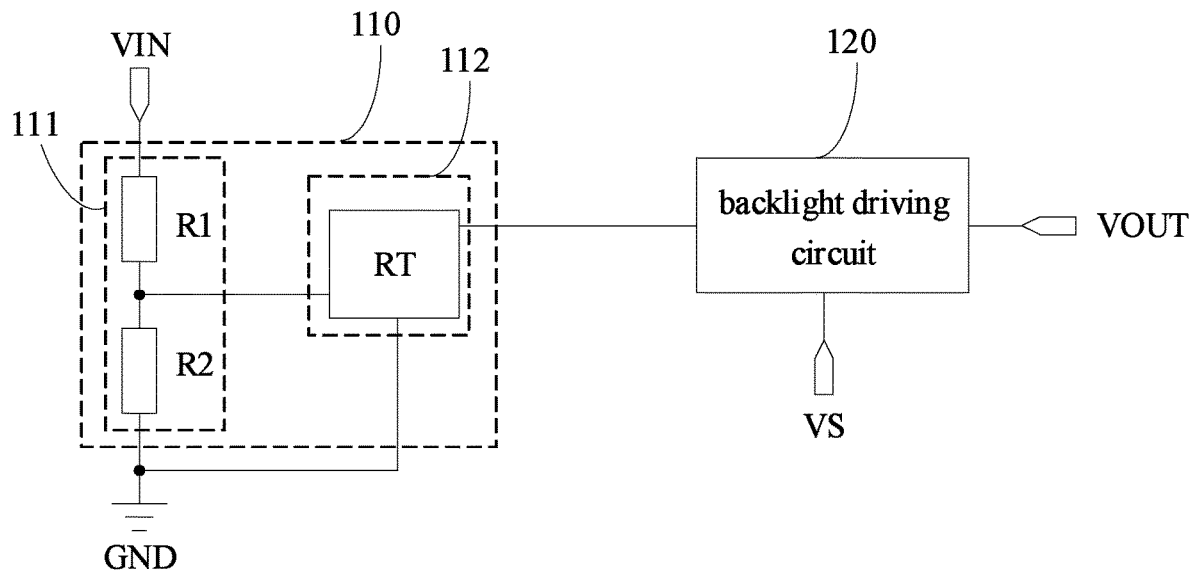
FIG. 3 is a specific schematic structural diagram of several other backlight control circuits provided by one or more embodiments of the present disclosure.

During specific implementation, in one or more embodiments of the present disclosure, as shown in FIG. 3, the voltage dividing circuit 111 may include: a first resistor R1 and a second resistor R2, wherein a second end of the first resistor R1 is used as the output end of the voltage dividing circuit 111, a first end of the first resistor R1 is electrically connected with the power supply voltage input end (VIN), the second end of the first resistor R1 is electrically connected with a first end of the second resistor R2, and a second end of the second resistor R2 is electrically connected with the ground.

During specific implementation, in one or more embodiments of the present disclosure, the first resistor R1 and the second resistor R2 may divide the voltage between the power supply voltage input end (VIN) and the ground. During practical application, specific resistance values of the first resistor R1 and the second resistor R2 may be designed and determined according to the actual application environment, and are not limited herein.

During specific implementation, in one or more embodiments of the present disclosure, a specific numerical value of the undervoltage threshold value may be empirically set, for example, the undervoltage threshold value may be set within a range of 4 V to 5 V. Certainly, in practical application, the voltages input from the power supply voltage input end (VIN), corresponding to the backlight control circuit in the different application environments, may be different, such that the specific numerical value of the undervoltage threshold value may be designed and determined according to the actual application environment, and is not limited herein.

During specific implementation, in one or more embodiments of the present disclosure, as shown in FIG. 3, the undervoltage protection circuit 110 may include: a voltage monitoring reset chip RT. It should be noted that the voltage monitoring reset chip RT may be substantially the same as a structure in the related art, and is not described in detail herein.

Figure 4:
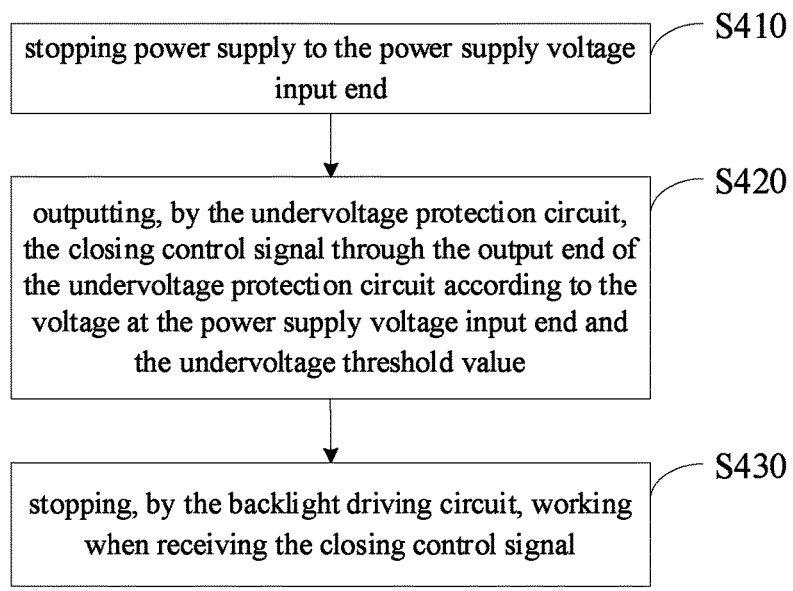
FIG. 4 is a flow diagram of several driving methods provided by one or more embodiments of the present disclosure.

Based on the same inventive concept, one or more embodiments of the present disclosure further provide a method for driving the backlight control circuit, and as shown in FIG. 4, the method may include the following steps:

S410, stopping power supply to the power supply voltage input end (VIN);

S420, outputting, by the undervoltage protection circuit 110, the closing control signal through the output end of the undervoltage protection circuit 110 according to the voltage at the power supply voltage input end (VIN) and the undervoltage threshold value; and S430, stopping, by the backlight driving circuit 120, working when receiving the closing control signal.

Figure 5:
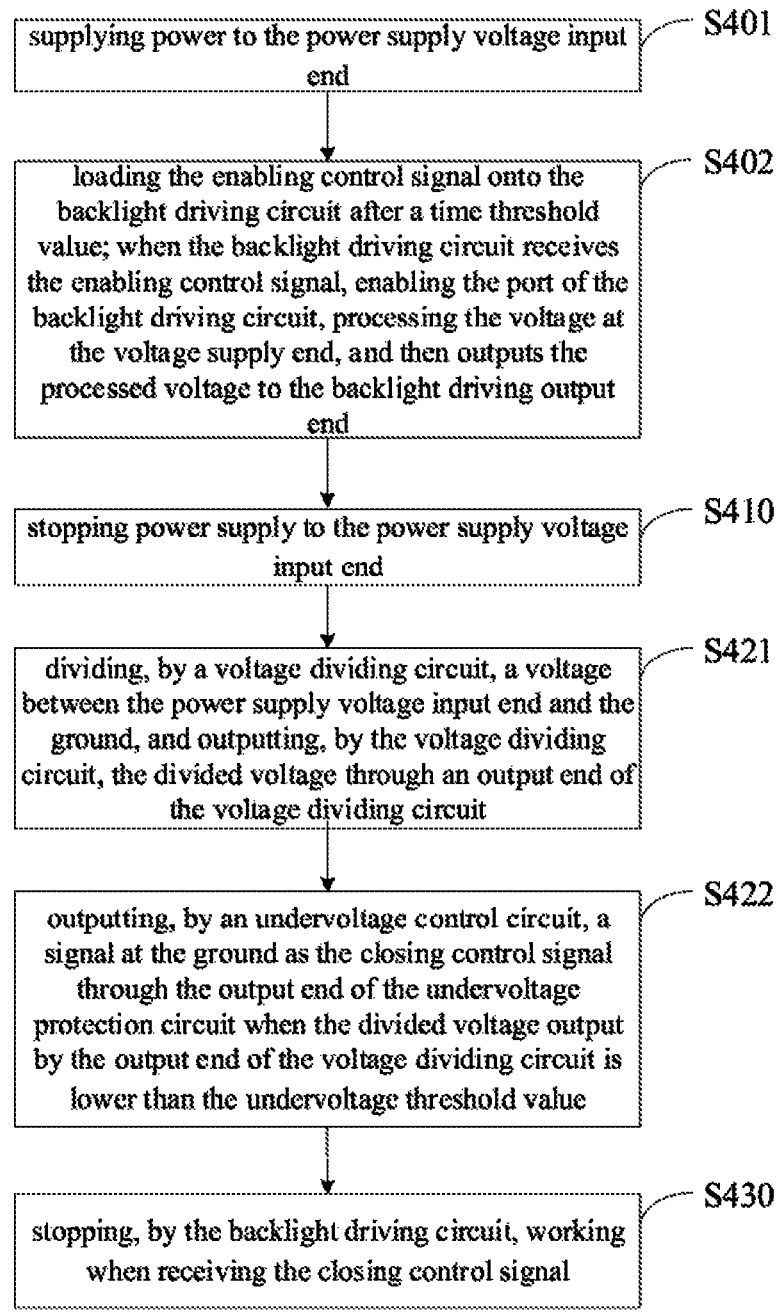
FIG. 5 is a specific flow diagram of several driving methods provided by one or more embodiments of the present disclosure.

During specific implementation, in one or more embodiments of the present disclosure, in step S420, outputting, by the undervoltage protection circuit 110, the closing control signal through the output end of the undervoltage protection circuit 110 according to the voltage at the power supply voltage input end (VIN) and the undervoltage threshold value, as shown in FIG. 5, may specifically include the following steps:

S421, dividing, by a voltage dividing circuit 111, a voltage between the power supply voltage input end (VIN) and the ground, and outputting, by the voltage dividing circuit 111, the divided voltage through an output end of the voltage dividing circuit; and S422, outputting, by an undervoltage control circuit 112, a signal at the ground as the closing control signal through the output end of the undervoltage protection circuit 110 when the divided voltage output by the output end of the voltage dividing circuit 111 is lower than the undervoltage threshold value.

During specific implementation, in one or more embodiments of the present disclosure, in step S410: as shown in FIG. 5, before stopping power supply to the power supply voltage input end (VIN) in step S410, the method may further include:

S401, supplying power to the power supply voltage input end (VIN); and

S402, loading the enabling control signal onto the backlight driving circuit 120 after a time threshold value; when the backlight driving circuit 120 receives the enabling control signal, enabling the port of the backlight driving circuit 120, processing the voltage at the voltage supply end (VS), and then outputs the processed voltage to the backlight driving output end (VOUT); wherein within the time threshold value, the undervoltage protection circuit 110 outputs the closing control signal through the output end of the undervoltage protection circuit 110 according to the voltage at the power supply voltage input end (VIN) and the undervoltage threshold value; and the backlight driving circuit 120 stops working when receiving the closing control signal.

During specific implementation, in one or more embodiments of the present disclosure, in a process of power supply to the power supply voltage input end (VIN), the voltage at the power supply voltage input end (VIN) is changed from low to high, thereby requiring a certain period of time to stabilize, and accordingly, the time threshold value may be set according to stabilizing time required for power supply to the power supply voltage input end (VIN). For example, after the power is supplied to the power supply voltage input end (VIN) for 3 seconds, which shows that the voltage at the power supply voltage input end (VIN) is stabilized, and then the time threshold value may be set to 3 seconds. Certainly, in practical application, the time threshold value may be designed and determined according to the actual application environment, and is not limited herein.

During specific implementation, in one or more embodiments of the present disclosure, within the time threshold value, the voltage dividing circuit 111 divides the voltage between the power supply voltage input end (VIN) and the ground, and outputs the divided voltage through the output end of the voltage dividing circuit. The undervoltage control circuit 112 outputs the signal at the ground as the closing control signal through the output end of the undervoltage protection circuit 110 when the divided voltage output by the output end of the voltage dividing circuit 111 is lower than the undervoltage threshold value; and the backlight driving circuit 120 stops working when receiving the closing control signal.

A working process of the backlight control circuit provided by one or more embodiments of the present disclosure is explained by taking a structure shown in FIG. 3 as an example below.

The method for driving the backlight control circuit provided by the embodiments of the present disclosure may include the following steps.

(1) The power is supplied to the power supply voltage input end (VIN). For example, a power conversion system receives an input voltage (for example, a voltage output by a battery), converts the voltage input into the power conversion system, and then supplies the converted voltage to the power supply voltage input end (VIN) and the voltage supply end (VS) of the backlight driving circuit 120 through an output port of the power conversion system.

In addition, within the time threshold value allowing the power to be supplied to the power supply voltage input end (VIN) for 3 s, a first resistor R1 and a second resistor R2 divide the voltage between the power supply voltage input end (VIN) and the ground, a second end of the resistor R1 outputs the divided voltage (Vc), and $$Vc = \frac{vin * r1}{r1 + r2}. \text{ If } Vc < Vq,$$

a voltage monitoring reset chip RT supplies the signal at the ground as the closing control signal to the backlight driving circuit 120, to make the backlight driving circuit 120 stop working; wherein Vq represents an undervoltage threshold value. If the enabling control signal is also output to the backlight driving circuit 120 at this time, due to the fact that the closing control signal and the enabling control signal are input into the same port of the backlight driving circuit 120, the port may be pulled down through the signal at the ground to prevent the backlight driving circuit 120 from working within a time period of Vc<Vq.

If Vc>Vq, it may show that power supply to the power supply voltage input end (VIN) is stabilized, and the voltage monitoring reset chip RT may stop working, that is, the ground is disconnected from the port of the backlight driving circuit 120.

(2) After the time threshold value of 3 s, if Vc>Vq, the voltage monitoring reset chip RT stops working, that is, the ground is disconnected from the port of the backlight driving circuit 120. In addition, the enabling control signal is loaded onto the backlight driving circuit 120 to enable the port of the backlight driving circuit 120; through the control of a PWM signal, the voltage at the voltage supply end (VS) may be boosted, and then the boosted voltage is output to the backlight driving output end (VOUT) and provided to the backlight source through the backlight driving output end (VOUT) to drive the backlight source to emit light.

(3) Power supply to the power supply voltage input end (VIN) is stopped. For example, when voltage input into the power conversion system is stopped or the power is suddenly cut off, the power conversion system will have no input voltage. Due to existence of the voltage stabilizing capacitor, the voltage at the power supply voltage input end (VIN) and the voltage at the voltage supply end (VS) of the backlight driving circuit 120 may slowly drop.

(4) In a slow dropping process of the voltage at the power supply voltage input end (VIN), the first resistor R1 and the second resistor R2 divide the voltage between the power supply voltage input end (VIN) and the ground, the second end of the resistor R1 outputs the divided voltage (Vc), and $$Vc = \frac{vin*r1}{r1+r2}. \text{ If } Vc < Vq,$$

the voltage monitoring reset chip RT supplies the signal at the ground as the closing control signal to the backlight driving circuit 120 to make the backlight driving circuit 120 stop working. If the enabling control signal is also output to the backlight driving circuit 120 at this time, due to the fact that the closing control signal and the enabling control signal are input into the same port of the backlight driving circuit 120, the port may be pulled down through the signal at the ground to prevent the backlight driving circuit 120 from continuing working after power supply to the power supply voltage input end (VIN) of the backlight driving circuit 120 is stopped, and then to prevent the high current from being generated.

Figure 6:
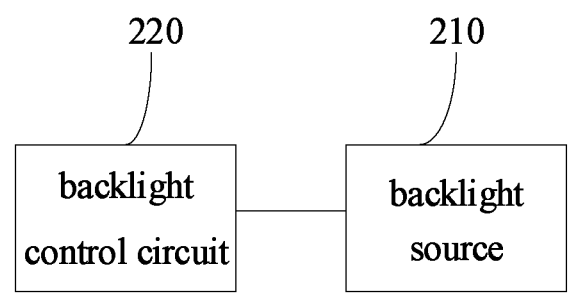
FIG. 6 is a schematic structural diagram of several backlight modules provided by one or more embodiments of the present disclosure.

Based on the same inventive concept, one or more embodiments of the present disclosure further provide a backlight module, and as shown in FIG. 6, the backlight module may include:

a backlight source 210; and
a backlight control circuit 220, wherein the backlight driving output end (VOUT) is electrically connected with the backlight source 210, and the backlight control circuit 220 is the above-mentioned backlight control circuit.

It should be noted that a specific structure and working process of the backlight control circuit may be seen from the above-mentioned description, and are not described in detail herein.

During specific implementation, the backlight source provided by one or more embodiments of the present disclosure may be a direct-lit type backlight source.

Figure 7:
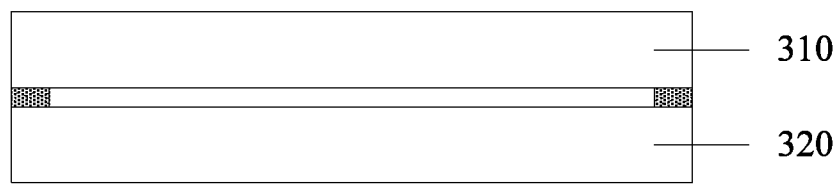
FIG. 7 is a schematic structural diagram of several display apparatuses provided by one or more embodiments of the present disclosure.

Based on the same inventive concept, one or more embodiments of the present disclosure further provide a display apparatus, and as shown in FIG. 7, the display apparatus may include:

a display panel 310, wherein the display panel 310 may be a liquid crystal display panel; and
a backlight module 320, wherein the backlight module 320 is located on a light incidence side of the display panel 310, and the backlight module 320 is the above-mentioned backlight module.

During specific implementation, the display apparatus provided by one or more embodiments of the present disclosure may be a mobile terminal, for example, any product or component having a display function, such as a mobile phone, a notebook computer, a tablet computer, a television, a digital photo frame, and a navigator. The other essential components of the display apparatus are ones that should be understood by a person of ordinary skill in the art, are not described in detail herein, and should not be construed as limitation on the present disclosure.

During specific description, the display apparatus in one or more embodiments of the present disclosure also may be a vehicle-mounted display product. Due to the fact that the vehicle-mounted display product is generally arranged in a vehicle, a power conversion system of the vehicle is generally employed to serve as a power conversion system of the display apparatus. The other essential components of the display apparatus are ones that should be understood by a person of ordinary skill in the art, are not described in detail herein, and should not be constructed as limitation on the present disclosure.

According to the backlight control circuit, the method for driving the same, the backlight module and the display apparatus provided by the embodiments of the present disclosure, the backlight driving circuit may enable the port of the backlight driving circuit when receiving the enabling control signal, for processing the voltage at the voltage supply end and then outputting the processed voltage to the backlight driving output end, to output the voltage to the backlight source through the backlight driving output end to drive the backlight source to be lighted. By arranging the undervoltage protection circuit, the undervoltage protection circuit outputs the closing control signal to the backlight driving circuit through the output end of the undervoltage protection circuit according to the relationship between the voltage at the power supply voltage input end and the undervoltage threshold value, and the backlight driving circuit may stop working when receiving the closing control signal. In this way, when the voltage at the power supply voltage input end changes, the closing control signal may be output to the backlight driving circuit through the undervoltage protection circuit, so as to control the backlight driving circuit to stop working, that is, voltage output to the backlight source is stopped, such that the high current is avoided, and then the loss problem of the elements such as the inductors and the diodes is alleviated.

Although the preferred embodiments of the present disclosure have been described, a person skilled in the art, upon attaining a basic inventive concept, may make additional alterations and modifications to these embodiments. Hence, it is intended that appended claims are interpreted as including the preferred embodiments and all the alterations and modifications that fall within the scope of the present disclosure.

Obviously, a person skilled in the art may make various modifications and variations to the embodiments of the present disclosure without departing from the spirit and scope of the embodiments of the present disclosure. In this way, it is intended that the present disclosure also includes such modifications and variations if the modifications and variations to the embodiments of the present disclosure fall within the scope of the claims of the present disclosure and the equivalent art thereof.

What is claimed is:

1. A backlight control circuit, comprising:
an undervoltage protection circuit, electrically connected with a power supply voltage input end and a ground separately; wherein the undervoltage protection circuit is configured to output a closing control signal through an output end of the undervoltage protection circuit according to a voltage at the power supply voltage input end and an undervoltage threshold value; and
a backlight driving circuit, electrically connected with a voltage supply end, a backlight driving output end and the output end of the undervoltage protection circuit separately; wherein the backlight driving circuit is configured to stop working when receiving the closing control signal;
wherein the undervoltage protection circuit comprises:
a voltage dividing circuit, electrically connected with the power supply voltage input end and the ground separately, wherein the voltage dividing circuit is configured to divide a voltage between the power supply voltage input end and the ground and output the divided voltage through an output end of the voltage dividing circuit; and
an undervoltage control circuit, electrically connected with the output end of the voltage dividing circuit and the ground separately, wherein the undervoltage control circuit is configured to output a signal at the ground as the closing control signal through the output end of the undervoltage protection circuit when the divided voltage output by the output end of the voltage dividing circuit is lower than the undervoltage threshold value.

2. The backlight control circuit according to claim 1, wherein the undervoltage threshold value is within a range of 4 V to 5 V.

3. The backlight control circuit according to claim 1, wherein the undervoltage protection circuit comprises: a voltage monitoring reset chip.

4. The backlight control circuit according to claim 1, wherein the voltage dividing circuit comprises: a first resistor and a second resistor;
a second end of the first resistor is used as the output end of the voltage dividing circuit;
a first end of the first resistor is electrically connected with the power supply voltage input end;
the second end of the first resistor is electrically connected with a first end of the second resistor; and
a second end of the second resistor is electrically connected with the ground.

5. A method for driving a backlight control circuit, the backlight control circuit comprising:
an undervoltage protection circuit, electrically connected with a power supply voltage input end and a ground separately; and
a backlight driving circuit, electrically connected with a voltage supply end, a backlight driving output end and an output end of the undervoltage protection circuit separately;
wherein the undervoltage protection circuit comprises:
a voltage dividing circuit, electrically connected with the power supply voltage input end and the ground separately; and
an undervoltage control circuit, electrically connected with an output end of the voltage dividing circuit and the ground separately;
the method comprising:
stopping power supply to the power supply voltage input end;
dividing, by the voltage dividing circuit, a voltage between the power supply voltage input end and the ground, and outputting, by the voltage dividing circuit, the divided voltage through the output end of the voltage dividing circuit;
outputting, by the undervoltage control circuit, a signal at the ground as a closing control signal through an output end of the undervoltage protection circuit when the divided voltage output by the output end of the voltage dividing circuit is lower than a undervoltage threshold value; and
stopping, by the backlight driving circuit, working when receiving the closing control signal.

6. The method for driving the backlight control circuit according to claim 5, wherein before stopping power supply to the power supply voltage input end, the method further comprises:
supplying power to the power supply voltage input end;
wherein within a time threshold value, the undervoltage protection circuit outputs the closing control signal through the output end of the undervoltage protection circuit according to the voltage at the power supply voltage input end and the undervoltage threshold value; and the backlight driving circuit stops working when receiving the closing control signal.

7. The method for driving the backlight control circuit according to claim 6, wherein within the time threshold value, the voltage dividing circuit divides the voltage between the power supply voltage input end and the ground, and outputs the divided voltage through the output end of the voltage dividing circuit;
the undervoltage control circuit outputs the signal at the ground as the closing control signal through the output end of the undervoltage protection circuit when the divided voltage output by the output end of the voltage dividing circuit is lower than the undervoltage threshold value; and
the backlight driving circuit stops working when receiving the closing control signal.

8. A backlight module, comprising:
a backlight source; and
a backlight control circuit the backlight control circuit comprising:
an undervoltage protection circuit, electrically connected with a power supply voltage input end and a ground separately; wherein the undervoltage protection circuit is configured to output a closing control signal through an output end of the undervoltage protection circuit according to a voltage at the power supply voltage input end and an undervoltage threshold value; and
a backlight driving circuit, electrically connected with a voltage supply end, a backlight driving output end and the output end of the undervoltage protection circuit separately; wherein the backlight driving circuit is configured to stop working when receiving the closing control signal; wherein the backlight driving output end is electrically connected with the backlight source;
wherein the undervoltage protection circuit comprises:
a voltage dividing circuit, electrically connected with the power supply voltage input end and the ground separately, wherein the voltage dividing circuit is configured to divide a voltage between the power supply voltage input end and the ground and output the divided voltage through an output end of the voltage dividing circuit; and an undervoltage control circuit, electrically connected with the output end of the voltage dividing circuit and the ground separately, wherein the undervoltage control circuit is configured to output a signal at the ground as the closing control signal through the output end of the undervoltage protection circuit when the divided voltage output by the output end of the voltage dividing circuit is lower than the undervoltage threshold value.

* * * * *